US010901796B2

(12) United States Patent
Mainali et al.

(10) Patent No.: US 10,901,796 B2
(45) Date of Patent: Jan. 26, 2021

(54) HASH-BASED PARTITIONING SYSTEM

(71) Applicant: Microsoft Technology Licensing, LLC, Redmond, WA (US)

(72) Inventors: Shane Mainali, Duvall, WA (US); Georgi M. Chalakov, Duvall, WA (US); Maneesh Sah, Sammamish, WA (US); Zichen Sun, Sammamish, WA (US); Michael E. Roberson, Seattle, WA (US); Andrew J. Edwards, Bellevue, WA (US); Jegan Devaraju, Redmond, WA (US); Krishnan Varadarajan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 195 days.

(21) Appl. No.: 16/024,193

(22) Filed: Jun. 29, 2018

(65) Prior Publication Data

US 2019/0004863 A1 Jan. 3, 2019

Related U.S. Application Data

(60) Provisional application No. 62/527,286, filed on Jun. 30, 2017.

(51) Int. Cl.
*G06F 9/50* (2006.01)
*G06F 13/14* (2006.01)
(Continued)

(52) U.S. Cl.
CPC ............ *G06F 9/505* (2013.01); *G06F 9/5061* (2013.01); *G06F 9/5072* (2013.01);
(Continued)

(58) Field of Classification Search
CPC ...... G06F 9/5061; G06F 9/505; G06F 9/5072; G06F 9/5083; G06F 16/9014; G06F 13/14; H04L 67/1002
See application file for complete search history.

(56) References Cited

U.S. PATENT DOCUMENTS 6,185,601 B1 2/2001 Wolff
8,572,091 B1 * 10/2013 Sivasubramanian ........................ G06F 16/278
707/747

(Continued)

FOREIGN PATENT DOCUMENTS

CN 105447112 A 3/2016

OTHER PUBLICATIONS

"Partitions and Data Distribution", http://docs.aws.amazon.com/amazondynamodb/latest/developerguide/HowItWorks.Partitions.html, Published on: Feb. 28, 2016, 4 pages.

(Continued)

*Primary Examiner* — Jacob D Dascomb
(74) *Attorney, Agent, or Firm* — Shook, Hardy & Bacon L.L.P.

(57) ABSTRACT

In various embodiments, methods and systems for implementing hash-based partitioning in distributed computing systems are provided. At a high level, a distributed computing system having an underlying range-based partitioning architecture for storage may be configured as a hash-based partitioning system, for example, a hybrid range-hash table storage. An operations engine of the hash-based partitioning system receives a tenant request to provision input/output operations per second (IOPS). The tenant request comprises a requested number of IOPS. Based on the tenant request, a provisioning operation to provision IOPS in a hybrid range-hash table storage with hash-based partitioning is determined. The provisioning operation is selected from one of (Continued)

the following: a table creation provisioning operation, an IOPS increase provisioning operation, and an IOPS decrease provisioning operation. The selected provisioning operation is executed for a corresponding table. A user request for data is processed using the table associated with the requested number of IOPS.

20 Claims, 7 Drawing Sheets

(51) Int. Cl.
*H04L 29/08* (2006.01)
*G06F 16/901* (2019.01)

(52) U.S. Cl.
CPC ............ *G06F 9/5083* (2013.01); *G06F 13/14* (2013.01); *G06F 16/9014* (2019.01); *H04L 67/1002* (2013.01)

(56) References Cited

U.S. PATENT DOCUMENTS

2016/0350392 A1\* 12/2016 Rice .................... G06F 16/2282
2016/0359970 A1\* 12/2016 Holt ........................ G06F 3/067

OTHER PUBLICATIONS

Bonvin, et al., "A self-organized, fault-tolerant and scalable replication scheme for cloud storage", In Proceedings of the 1st ACM symposium on Cloud computing, Jun. 10, 2010, pp. 205-216.
"Realtime Cloud Storage Working with tables", http://storage-public.realtime.co/documentation/starting-guide/1.0.0/working-with-tables.html, Published on: Feb. 27, 2015, 6 pages.
Nanniyur, Satheesh, "Sherpa Scales New Heights", https://yahooeng.tumblr.com/post/120730204806/sherpa-scales-new-heights, Published on: Jun. 4, 2015, 7 pages.
Nuaimi, et al., "Partial Storage Optimization and Load Control Strategy of Cloud Data Centers", In Journal of the Scientific World Journal, Apr. 20, 2015, 20 pages.
Anderson, et al., "CouchDB the Definitive Guide", http://guide.couchdb.org/draft/clustering.html, Published on: Sep. 7, 2010, 8 pages.
Vondra, Tomas, "Tables and indexes vs. HDD and SSD", http://blog.2ndquadrant.com/tables-and-indexes-vs-hdd-and-ssd/, Published on: Mar. 17, 2016, 4 pages.
Ganesan, et al., "Online Balancing of Range-Partitioned Data with Applications to Peer-to-Peer Systems", In Proceedings of the 30th international conference on Very large data bases-Volume, Aug. 31, 2004, 12 pages.
Cooper, et al., "PNUTS: Yahoo!'s Hosted Data Serving Plattorm", In Proceedings of the VLDB Endowment, Aug. 24, 2008, 12 pages.

\* cited by examiner

HASH-BASED PARTITIONING SYSTEM

CROSS-REFERENCE TO RELATED APPLICATION

This application claims priority to Provisional Patent Application No. 62/527,286, filed Jun. 30, 2017, and entitled "HASH-BASED PARTITIONING SYSTEM," the entire contents of which is incorporated herein by reference in its entirety.

BACKGROUND

Users often rely on applications and services to perform computing tasks. Distributed computing systems (e.g., cloud computing platforms) are computing architectures that support network access to a shared pool of configurable computing and storage resources. A distributed computing system can support building, deploying and managing applications and services. An increasing number of users and enterprises are moving away from traditional computing architectures to run their applications and services on distributed computing systems. With the ever-increasing use of distributed computing systems, improvements in computing operations for managing distributed data and, in particular, improved partitioning and load balancing can provide more efficient processing of distributed data and efficiency in storage and retrieval of distributed data.

SUMMARY

Embodiments of the present invention relate to methods, systems, and computer storage media for providing a hash-based partitioning system for a distributed computing system. By way of background, a distributed computing system may be built on a range partitioning framework that supports dynamic load balancing. In particular, dynamic load balancing is implemented using partition keys associated with data traffic and the size of distributed data across a partition key space. Load balancing operations may incur downtime which results in unpredictable impact on the distributed computing system and other related operations. Moreover, in some situations, range partitioning may directly impact tenants of the distributed computing system (e.g., load distribution issues), which often is a complex problem to resolve at the tenant infrastructure level of the distributed computing system.

Embodiments described in the present disclosure are directed towards technologies for improving partitioning in a distributed computing system. At a high level, a distributed computing system having an underlying range-based partitioning architecture may be retrofitted with hash-based partitioning components or redesigned as a hash-based partitioning system. The hash-based partitioning system provides dynamic load balancing in a replication-free manner (i.e. without data copying).

Conventional systems may utilize hashes in load balancing operations; however such implementations are inherently flawed in that load balancing includes replication of data in a distributed computing system in executing load balancing operations. In particular, the distributed computing system lacks a range-based architecture that supports load balancing without replication, in contrast to embodiments described below. In this regard, hash-based partitioning system is built on top of a range-based architecture such that the resulting range-hash hybrid storage provides a way for offering key-value store functionality with a hash-based partitioning model in order to distribute load evenly while still maintaining strong consistency. Additionally, dynamic load balancing is implemented to increase and decrease load capability on the fly, without replicating data.

Accordingly, one example embodiment of the present invention provides improved partitioning using a hybrid range-hash table storage. An operations engine of the hash-based partitioning table storage receives a tenant request to provision input/output operations per second (IOPS). The tenant request comprises a requested number of IOPS. Based on the tenant request, a provisioning operation to provision IOPS in a hybrid range-hash table storage with hash-based partitioning is determined. The provisioning operation is selected from one of the following: a table creation provisioning operation, an IOPS increase provisioning operation, and an IOPS decrease provisioning operation. The selected provisioning operation is executed using a table operating based on a hash partition model. The operations engine further receives a user request. The user request comprises a partition key value. A hash value is determined for the partition key value, where the hash value corresponds to the table associated with the requested number of IOPS. Based on the hash value, accessing data associated with the table.

As such, the embodiments described herein improve computing operations for load balancing by removing unpredictability of range-based partitioning and implementing hash-based partitioning. In addition, hash-based partitioning removes load distribution issues as hash-based partitioning further supports load distribution for a tenant infrastructure. Moreover, the hash-based partitioning operations leverage the range-based architecture to support dynamic load balancing in a replication-free manner that obviates copying of data in the distributed computing system. Replication-free load balancing provides flexibility in storage and retrieval of data in the distributed computing system resulting in computing efficiency in processing tenant data requests.

Advantageously, the hash-based partitioning system may be a streamlined implementation in that, firstly, the hash-based partitioning system may be implemented exclusively with solid state drives, in contrast to a combination of solid state drives and hard disk drives. Secondly, the hash-based partitioning system may be implemented with a single service infrastructure (i.e., a table only) instead of a multi-service infrastructure (i.e., blob, queue, table, and files).

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
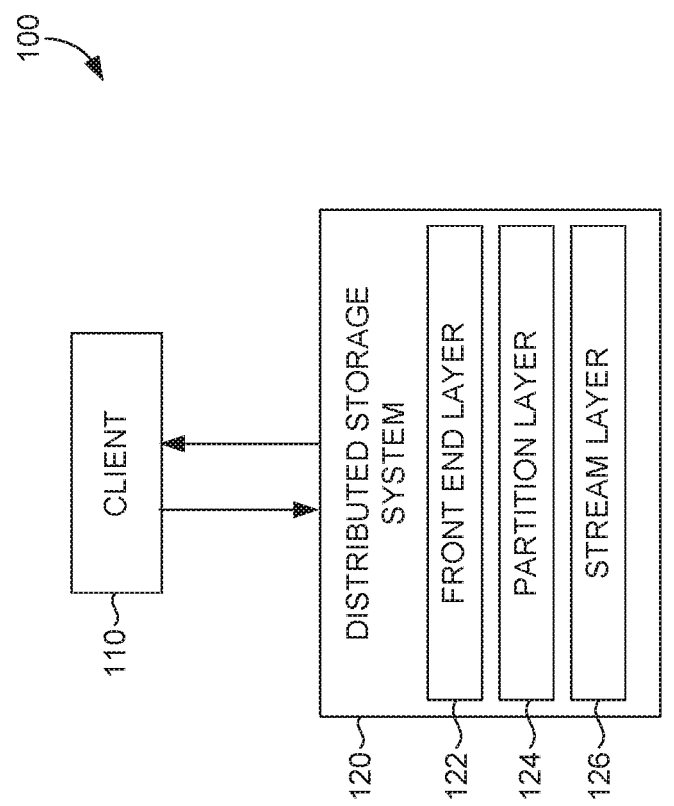
FIG. 1 is a block diagram of an example hash-based partitioning system, in accordance with embodiments described herein.

Distributed computing systems (e.g., cloud computing platforms) are computing architectures that support network access to a shared pool of configurable computing and storage resources. Distributed computing systems support providing applications and services to perform computing tasks. By way of example, a distributed computing system may be built with table storage (e.g., a table service). In particular, table storage may be a scalable, efficient, noSQL key value store. For example, table storage in a distributed computing system may be used for flexible datasets (e.g., web app user data, address books, device information, and other metadata). Table storage may have several drawbacks in implementations that do not have latency guarantees, which may be unsuitable for different types of applications. Moreover, if provisioning of resources for tables is not supported, tenants of the distributed computing system may experience operational blips when load balancing operations are being performed. Overall, a distributed computing system may not adequately support tenant applications when a table storage is implemented without high availability, high IOPS/throughput, and low latency.

By way of background, a distributed computing system may be built on a range partitioning framework that supports dynamic load balancing. In particular, dynamic load balancing is implemented using partition keys associated with traffic and the size of distributed data across a partition key space. Load balancing operations may incur downtime which results in unpredictable impact on the distributed computing system operations. Moreover, in some situations, range partitioning may directly impact tenant applications and tenant infrastructure of the distributed computing system (e.g., load distribution issues), which often is a complex problem to resolve at the tenant infrastructure level of the distributed computing system.

By way of context, an example table storage (or table service) may be built as a flexible model of entities and properties. At a high level, tables contain entities, and entities have properties. The table storage may be designed for scalability and availability. The table storage may be implemented with a schema and partition framework. By way of example, a table may be a container storing data. Data may be stored in tables as collection of entities. Entities may be stored in tables, where an entity may include a set of name-value pairs called properties. An entity may have mandatory properties (e.g., a partition key, a row key, and timestamp). The combination of a partition key and row key may be used to uniquely identify an entity. The table service stores data in several nodes based on entities' partition key property values. Entities with the same partition key are stored on a single storage node. A partition is a collection of entities with the same partition key. A row key uniquely identifies an entity within a partition.

In one example implementation, a table storage may be implemented with two main components: tables and objects (i.e., entities) identified using the table. The tables and the associated metadata may be stored in table container and the objects stored in a table-entity utility table. The table-entity utility table may have a defined schema. The table-entity utility table schema may include several different columns (e.g., account name, table name, partition key, row key, timestamp, and values). For example, a value column may be a dictionary and the value store for each row.

With reference to the partition framework, each partition may be associated with a key range corresponding to the data the partition is serving. In one example implementation, the key range may be implemented as an inclusive key low and exclusive key high, each being a partition key. Each partition may be totally independent, with its own index. Each partition may be served by one server. The partitioning may be dynamically performed based on the load of the system. The partition framework further includes a partition key, and a row key, where the partition key defines how to partition the data. For example, all data with the same partition key may be served by one server, such that, when a partition split or merge is performed, the split or merge is executed at the partition key level. The partition key may be made up of several columns from the table-entity utility table (e.g. account name, table name, partition key). The row key may define the sort order within a partition key (i.e., for all data with the same partition key value). The partition key may be implemented as a prefix for the row key, where the row key is a primary key for the table. The row key may be made up of several columns from the table-entity utility table (e.g., account name, table name, partition key and row key).

A conventional table storage may support a range partitioning model. By way of context, table storage partition may be based on two main elements: size and traffic. The size and traffic thresholds may be configured differently for different hardware SKUs. For example, there are certain size limits that a partition can handle (e.g., 2 TB) and there are certain input/output operations per second ("IOPS") limits, ingress/egress and an amount of timeout/throttling due to loads of a partition (e.g., 1K IOPs>100 IOPs & >0.01% timeout/throttle may be configured). The size and traffic thresholds are defined as load balancing rules. Other types of rules may also be configured for the range partitioning model.

When a partition meets a defined load balancing rule, an offload or split operation may be performed on the partition depending on the corresponding rule and computing environment. An offload operation may refer to moving partitions around to different servers to better balance the data load across servers. A split operation may refer to choosing a partition key and then splitting the partition into two independent partitions in order to scale out. Additionally, the total partition count for a tenant may be a resource that is a consideration for load balancing operations. Tenant partition count may impact scalability and performance, load balancing scalability, and partition resource overhead. Across different hardware SKUs and sizes of tenant infrastructures, partitions, by way of example, may range from 3 k to 15 k partitions. In order to maintain this resource, a merge operation may be performed on adjacent partitions which meet merge criteria. Some of the merge criteria may include, the size, the IOPS limits, ingress limits, and both partitions having little load over a predefined period of time. Moreover, buffers may be implemented for merge checks to try to ensure split operations are not triggered only shortly after merge operations.

In some table storages, tenants may not have the capacity to do the following: provision resources for tables, perform any pre-partitioning, or hint to the table service about incoming loads. The partitioning may be totally dynamic and controlled centrally via the table storage management components. As such tenants sometimes develop ad hoc workarounds for their specific tenant infrastructure. For example, a tenant infrastructure may implement ramp ups and/or maintain loads for workarounds. As such, a conventional implementation of partitioning, as described, may be limited and inefficient in supporting applications and services in a distributed computing system.

Embodiments of the present invention are directed to simple and efficient methods, systems, and computer storage media for improving partitioning in a distributed computing system. At a high level, a distributed computing system having an underlying range-based partitioning architecture may be retrofitted with hash-based partitioning components (e.g., operations engine, tables, hashing algorithm) or in other words, redesigned as a hash-based partitioning system. The hash-based partitioning system provides dynamic load balancing in a replication-free manner (i.e. without data copying).

By way of background, hash-based partitioning may generally refer to a partitioning technique where a hash key is used to distribute rows evenly across different partitions. In another hash partitioning model, hash values or buckets can be pre-partitioned, for example, when there are a number of hash values or buckets (e.g., for a given table), writes are hashed to the buckets such that load is spread evenly among them. Additionally, a simple user input of just total input/output operations per second ("IOPS") desired may be sufficient to partition effectively; this may be simple for both the tenant and the underlying hash-based partitioning system. In terms of performance modeling, hash-based partitioning may be simpler for migration from a relational database computing environment because the hash-based partitioning system is agnostic to how data load is distributed, what the key space looks like, and how to scale out work for applications. Hash-based partitioning may also be advantageous in that hash-based partitioning handles append only traffic at scale much better than range-based partitioning.

Conventional systems may utilize hashes in load balancing operations; however such implementation are fundamentally flawed in that load balancing includes replication of data in a distributed computing system in executing load balancing operations. In particular, the distributed computing system lacks a range-based architecture that supports load balancing without replication, in contrast to embodiments described below. In this regard, hash-based partitioning system in built on top of a range-based architecture such that the resulting range-hash hybrid provides a way for offering key-value store functionality with a hash-based partitioning model in order to distribute load evenly while still maintaining strong consistency. Additionally, dynamic load balancing is implemented to increase and decrease load capability on the fly, without replicating data.

The hash-based partitioning system may implement an operations engine to support functionality described herein. The operations engine may be made up of different arrangements of components. By way of example, the operations engine may include a front end, a provisioning manager, a table master, and a billing manager; however other variations and combinations of arrangements and delegation of functionality are contemplated with embodiments described herein. The hash-based partitioning system, tables in particular, may be implemented to have parity with existing range partitioning model tables (e.g., a hybrid range-hash table service). For example, any operation (e.g., a write) may operate the same as with ranged-based tables. Additionally, range queries within a user partition may also be the same. However, range queries across user partition key values may be different for hash-based partitioning because the hash-based partition system operates to hop around in order to return results in lexicographical order. Returning results in lexicographical order is how the ranged-based tables currently operate (i.e., scans are ordered—referred herein as ordered scan).

The hash partitioning model tables may be tables similar to the range partitioning model tables. The table-entity utility table may be altered to have an added hash column along with account name, table name, partition key, row key, timestamp, and values, the resulting table referred to herein as a table-entity utility table. The partition key may also be altered to include a hash column along with account name, table name, hash, and partition key. In this regard, the hash partitioning model tables parallel the range partitioning model tables but each is part of a different schema.

The operations engine supports tenant provisioning operations and user request operations. With initial reference to provisioning operations, when a table is created or when provisioned IOPS are changed, a provisioning operation is performed. The provisioning operation may split and/or merge partitions to provision a proper amount of partitions required to meet the provisioned IOPS. For example, the provisioning operation may take the total IOPS requested as tenant input at table creation time or provisioned IOPS change time. The provisioning logic may be performed using a table master or any other dedicated component that tracks how many partitions are required for a given set of IOPS, and executing provisioning changes. The allocation granularity of the table master is based on a mapping between tables and partitions. For example, if a table has 3 partitions, the table master may track for each partition how many IOPS to use from the table IOPS total. A given partition may then support multiple IOPS allocations for different tables. In this regard, allocation may be managed outside of a table server but still allows allocation fairly across tables, even if they are in the same partition.

The table master is responsible for performing provisioning operations. The table master has knowledge of all table IOPS requirements in the hash-based partitioning system and knowledge of the partitions. The table master tracks how many IOPS a table needs as well as how many partitions a table currently has. The table master may be notified on any IOPS allocation changes. The table master may perform the provisioning operation for any IOPS changes (i.e., both increases and decreases). The table master may make a determination of how to process an IOPS change.

Changing provisioned IOPS may be done with a combination of splits and merges to a desired partition configuration. However, it may be much simpler treat each partition as having a window of IOPS and using more of a double-halving model based on the window. Specifically, the provisioning IOPS changing operations (e.g., increase or decrease) may be implemented to grow and shrink in 100% and 50% increments respectively. For example, given 10,000 IOPS that requires 10 partitions and 20,000 IOPs that require 20 partitions, if a tenant requests for anywhere from >10,000 IOPS to <=20,000 IOPS, the provision operation can provision 20 partitions. In this regard, the provision operation may be implemented in a simplified manner merely at the cost of a few additional partitions, which can be computationally less expensive compared to the alternative. Specific provisioning and performance configuration may be implemented in the hash-based partition system. For example, it is contemplated that split operations may be done in parallel. For changing provisioned IOPS, because a live service may be running, split operations may be performed incrementally. It is further contemplated that a split may still be performed based on a partition key; for example, the schema may be configured such that the partition key may be determined from any split key that is generated. Other variations and combinations of provisioning and performance configurations are contemplated with embodiments of the present invention.

Increases in IOPS (i.e., an IOPS increase provisioning operation) may be treated as a high priority operation. As described above, a determination may be that the right number of partitions already exists for an increase in IOPs, so no change is needed. However, if additional partitions are needed, a splitting operation may be performed. Decreases in IOPS (i.e., an IOPS decrease provisioning operation) may be treated as lower priority operations. Decreases may allow the hash-based partitioning system to recapture some partition resources, with the same doubling-halving model described above. The table master may not have to do any merging if there is no urgency to merge partitions. The hash-based partitioning system may implement a predefined merging time period where merging operations are performed based on a predefined time period. It is contemplated that merging may be performed sparingly; as such the predefined merging time period may allow merging operations to be spread out accordingly.

The provisioning operations include determining a number of partitions and partition key ranges for the IOPS. This determination may be explained by way of example. A physical IOPS limit per partition may be set to 1000 and a maximum number of hash buckets may be set to 10,000. It is contemplated that no actual maximum number of hash buckets may exist; however one is used here for illustrative purposes. Take for example, a tenant initially requests 10,000 IOPS, an example algorithm for provisioning the request may include the following: physically, the tenant needs 10 partitions, each partition doing 1,000 IOPS to meet the 10,000 IOPS demand. This would result in 10 hash ranges of [0, 1000), . . . , [9000, 10000]. The provisioning operation may be performed exactly based on the physical requirement, but some flexibility may be incorporated in the provisioning operation (e.g., a 2× factor). With the 2× factor, the 20 hash ranges would be [0, 500), . . . , [9500, 10000). The provisioning operation may further include splitting on the 20 hash ranges to create 20 physical partitions for the user traffic.

The provisioning manager can operate with the table master to provide functionality described herein. The provisioning manager may be a server that supports tenant accounts and the tables. The provisioning manager may receive a request to create a table or change provisioned IOPS. The tenant may poll for the provisioning manager for completion of the request. When the provisioning manager receives a tenant request, the provisioning manager may update a requested IOPS entry and a requested IOPS time entry of a table row in the table container, which will in turn trigger the table master to get notified. When the table master finishes the provisioning step, as discussed above, the table master may update the provisioned IOPS and provisioned IOPS time, which is an indication to provisioning manager that the provisioning operation has been completed at the table master. In this regard, the provisioning manager may also be responsible for processing create table and provisioned IOPS change requests. The provisioning manager may insert or update a row in a table container. For example, a trigger may be configured for row insertions into a table container, where the table master is receives an update on the IOPS of the table container. In another implementation, flags and metadata in the table containers may configured such that the trigger only occurs when it is time for the IOPS to take effect.

The provisioning manager may also support table creation. For example, at table creation time, a tenant may specify a total IOPS requested for the table. A table container row for the table may be created while asynchronously provisioning the IOPS. The table may be set to a provisioning state until the provisioning operation is completed. When created, the table may be marked as provisioned. After a table is created, the tenant's traffic may change for many reasons and the tenant may change the provisioned IOPS. This change may be done via Set Table Properties. Similar to table creation, the change will be asynchronous and the tenant would need to poll the table properties. The change request is acknowledged and communicated to the tenant, while provisioning asynchronously. While in progress, the table will be in a "Provisioning" state. The provisioning manager may only allow one active provisioning change for a given table at a time; concurrent changes may be throttled with an error "A provisioning change is already ongoing".

The hash-based partitioning system can also support IOPS tracking and IOPS throttling. Each partition may track the IOPS it is receiving by table. A partition may track a group of tables associated with the particular partition. The table master may execute provisioning operations to allocate IOPS to partitions and ensure that the IOPS allocation for a given table does not go beyond the table's provisioned IOPS. In operation, for the table containers (i.e., storing the rows of the table metadata) a table server may do a scan when a partition is loaded. The table server communicates per-table IOPS limit data to the table master. For example, the table master may issue a command to the table server for a per-table IOPS limit data or vice versa. In another embodiment, the provisioning manager may scan table containers for the per-table IOPS limit.

The table server may be responsible for throttling. Throttling may generally refer to dropping requests to a partition that has too much traffic being sent to it. If a given table in a given partition has insufficient IOPS, the requests would compete for IOPS from that table. It is likely that given a minimum IOPS limit in the hash-based partitioning system, tables may not share partitions. However, it may be possible to support smaller IOPS limits per table in a model that allows tables to share partitions. A given partition key value may be configured with an IOPS limit that is predictable. For example, a per-partition limit of 1000 IOPS and a per partition key limit of 100 IOPS. In operation, the table server may implement throttling based on sampling partition key values and throttling partition key values approaching the IOPS limit. The per-partition tracking may be configured to be small because there are not many distinct partition keys that would reach the limit before partition level throttling is initiated.

The operations engine is responsible for performing file table merge operation. The file table merge operation may be implemented to re-use pages from delta file tables and perform page level operations or row level operations. The file table merge operation may include support for append only operations. By way of background, conventional file table merge operations may include rewriting the pages from delta file tables without properly re-using pages from delta file tables. Moreover, file table merge operations may be aggressively executed. For example, merging a 64 MB delta file table into a 2 TB base file table, which may result in poor write amplification when the traffic is spread randomly across, because the whole index of the file table tree gets rewritten even for small merges and a huge amount of pages is processed. Embodiments of the present invention may implement a size-based delta file table model, where we have some factor e.g., 4×, so that if the base is 2 TB, the next delta has to be at least 512 GB before a file table merge operation is performed to merge the file table with a base table. Then the next 128 GB, the 32 GB and so on. This file table merge operation bounds write amplification factor to the selected factor (i.e., 4×).

File table garbage my build up with more with the sized-based delta file table model. As such, a garbage collection hint or time-based trigger may be implemented to trigger a merge into the base file table. Additional operations may be implemented to improve file table garbage collection performance. For example, garbage collection operations can include tracking occupancies per index page when a file table merge operation is executed, file table garbage collection compaction, and file table garbage collection parallelization. Other variations of combinations of the operations engine components comprising logic for tracking, and determining and throttling IOPs limits are contemplated in embodiment described herein.

The hash-based partitioning system can also support bursting provisioning. The table master may implement bursting provisioning operations based on tracking the total IOPS allocated as well as whatever defined burst allowance. The table master may track burst allowance over time and periodically update the burst allowance in table containers. The table master may use the burst allowance as a remediation operation, whenever there is additional burst provisioning IOPS remaining. For example, the burst allowance may be used when a tenant goes over its allocated IOPS, The hash-based partitioning system may implement certain limitations on components in order to facilitate managing hash-based partitioning system operations. For example, table minimum IOPS, where each may have minimum IOPS constraints. Such a limit may facilitate the overprovisioning model as well as keep the number of tables to track bounded for a given storage stamp. For example, table IOPS limit, where a given table's IOPS may be throttled according to the provisioned IOPS set by the tenant. For example, an account provisioned IOPS limit that indicates the maximum limit on the overall number of provisioned IOPS for a given storage account. The account provisioned IOPS limit may be checked at table creation and IOPS allocation change time. In another example, a size limit may be placed on the table size. The hash-based partitioning system may limit the size of a table based a number IOPS such that higher IOPS table are allowed to grow bigger and enforce the size based on any variation or combination of methods for tracking, throttling, and updating table sizes. Similarly, a size limit may be placed on the partition key size (e.g., 1 GB). The hash-based partitioning system may limit the size of the partition key at the file table level, but other variations of limiting the partition key size are contemplated.

The hash-based partitioning system may support configuration settings for certain variables in the hash-based partitioning system. Some configuration settings may be associated with load balancing rules or dynamic configuration. Some example configuration settings include current hash algorithm: per-tenant and per-account settings; number of IOPS per partition: per-tenant and per-account settings; single partition key IOPS throttling limit: per-tenant and per-account settings; table size throttling threshold: per-tenant and per-account settings; account provisioned IOPS threshold: per-tenant and per-account settings; number of historical IOPS changes to keep: per-tenant; per table server max IOPS to serve, when to start LB, etc.; configurations for any features specific to tables for performance.

Turning to user request operations, at a high level, a request may be received from at a front end (e.g., a front end service). The front end may be configured to manage a hashing logic, such that the tables are agnostic to hashing. Based on the user request, the front end may hash the user's partition key value to determine the hash value, and the resulting key for the request. The hash operation may be hidden from the user. By way of example, hashing is based on the partition key to determine the hash value. In one scenario, partition key may map to the same hash value (e.g., partition keys "A123Y" and "X4J20" both map to the same hash value: "17". In another scenario, partition keys may map to the same hash range which a single partition is serving (e.g., a single partition hash range [7, 16), partition key "A" maps to hash 11, and partition key "Q" maps to hash 9. The second scenario, may be common by design, especially the smaller the provisioned IOPS and table are. The first scenario, may be much less common given that the hash space is [0, UINT32_MAX). Nonetheless, the hash algorithm operates to spread the partition keys across hashes.

For any received table request, the front end may look up the account and table properties before performing row-level operations. From the account, the front end may determine that the user request is associated with a table operating using a hash partitioning model. From the table container, the front end may determine the hash algorithm metadata. For example, the hash algorithm and any information required for the hash algorithm (e.g., metadata) may be stored with table properties of the tenant. The tenant table properties may be fetched from a cache location or the table container. The front end may access the following: account name, table name, partition key and row key, from a user request, and apply the hash algorithm to internally translate keys to the following: account name, table name, hash, partition key, and row key. The front end communicates internal keys to the table server. The table server may deny any request that does not include a hash. It is contemplated that when any data is returned to the user, the hash may be stripped from the data. In particular, the front end may receive rows back from the table server and strip out the hash column from any response data back to the user. For example, hash column may not be projected or in the alternative manually striped when forming the response to the user. User requests may be processed via the operations engine that supports parallel writes and performs batch control operations. The operations engine may also support multi log support for table partitions. The operations engine features support achieving low latencies and high throughput/IOPS for user writes.

The hash-based partitioning system may implement a billing manager. The billing manager may manage billing, limits, and metrics as described in more detail below. Billing may be based on IOPS and an IOPS may have a defined size. For example, a write IOP may be 1 KB and a read IOP size may be 4 KB. Rounding may be used to determine the number of IOPS, for example, for writes, 800 bytes is 1 IOP, and 1 KB is 1 IOP, 1.2 KB is 2 IOPS. The billing manager may generate bills for a corresponding tenant of the distributed computing system. For example, a tenant may be billed for provisioned IOPS of a given table. The tenant may also be billed for the used capacity of a given table. The provisioned IOP charge may generally be a major charge with the capacity charge being much lower. The billing manager may specifically keep the charges separate to simplify the billing model. With the simple billing model, some protection may be accommodated for cases like a low IOPS and high size table. In one embodiment, provisioned IOPS may be implemented in tiers (e.g., P1: 1 k IOPS P5: 5 k IOPS P10: 10 k IOPS P25: 25 k IOPS P50: 50 k IOPS P100: 100 k IOPS).

In operation, the billing manager may access that a table container to read provisioned IOPS. The billing manager may also accommodate situations where a tenant changes the provisioned IOPs and did not use the IOPs for a whole day. The billing manager may also use the internal indexing overhead for each row stored in the HBPS. For example, if a row has 128 byte overhead and a write IOP is 1 KB, then the tenant can add 896 bytes for their data and still have 1 IOP; however if the tenant adds 897 bytes then it is 2 IOPs.

As such, the embodiments described herein improve computing operations for load balancing by removing unpredictability of range-based partitioning and implementing hash-based partitioning. In addition, hash-based partitioning removes load distribution issues as hash-based partitioning further supports load distribution for a tenant infrastructure. Moreover, the hash-based partitioning operations leverage the range-based architecture to support dynamic load balancing in a replication-free manner that obviates copying of data in the distributed computing system. Replication-free load balancing provides flexibility in storage and retrieval of data in the distributed computing system resulting in computing efficiency in processing tenant data requests. Advantageously, the hash-based partitioning system may be a streamlined implementation in that, firstly, the hash-based partitioning system may be implemented exclusively with solid state drives, in contrast to a combination of solid state drives and hard disk drives, and secondly, the hash-based partitioning system may be implemented with a single service infrastructure (i.e., a table only) instead of a multi-service infrastructure (i.e., blob, queue, table, and files).

With reference to FIG. 1, a high level architecture of a distributed computing system is illustrated. The distributed computing system includes a distributed storage system 120 having a front end (FE) layer 122, a partition layer 124, and a stream layer 126 (or distributed file system layer). The distributed computing system further include hash-based partition system components (not shown), which are discussed with reference to FIG. 2. The FE 122 layer may be configured for receiving incoming requests from a client 110 or application. Upon receiving a request, the FE 122 can authenticate and authorize the request. The FE 122 can route the request to a partition server in the partition layer. In embodiments, the FE 122 maintains a partition map that keeps track of partition name ranges and which table server or partition server is serving which partition names.

The partition layer 124 is responsible for managing and understanding high level abstractions of user files, structured storages, and messaging. The partition layer 124 also provides a scalable index, transaction ordering, and storing consistency for objects. The partition layer 124 can specifically support storing object data on top of the stream layer 126. In embodiments, the partition layer partitions data objects within a storage stamp.

The stream layer 126 stores bits on disk and supports replicating the data across many servers to keep data durable within a storage stamp. The stream layer 126 supports files called streams which are ordered lists of large storage chunks called extents. The stream layer stores and replicates extents. The data stored in the stream layer is accessible from the partition layer 124. The stream layer 126 may provide a file system namespace and an Application Programming Interface (API) for the partition layer 124 to perform writes. Writes can be append-only. The interface between the stream layer 126 and partition layer 124 allows a client to open, close, delete, rename, append to, and concatenate streams. A stream can refer to an ordered list of extent points and an extent is a sequence of append blocks. An extent can be a seal extent, such that, the extent can no longer be appended to. An application can read data from extents to access block contents of the extents.

The stream layer 126 can include a stream manager (not shown) and extent node (not shown). The stream manager is responsible for tracking the stream namespace, what extents are in each stream and the extent allocation across extent nodes. The stream manager performs lazy re-replication of extent replicas that are lost due to hardware failures or unavailability. Each extent node maintains the storage for a set of replicas assigned to the corresponding extent by the stream manager. Each extent node contains a view about the extents it owns and where the peer replicas are for a given extent.

Figure 2:
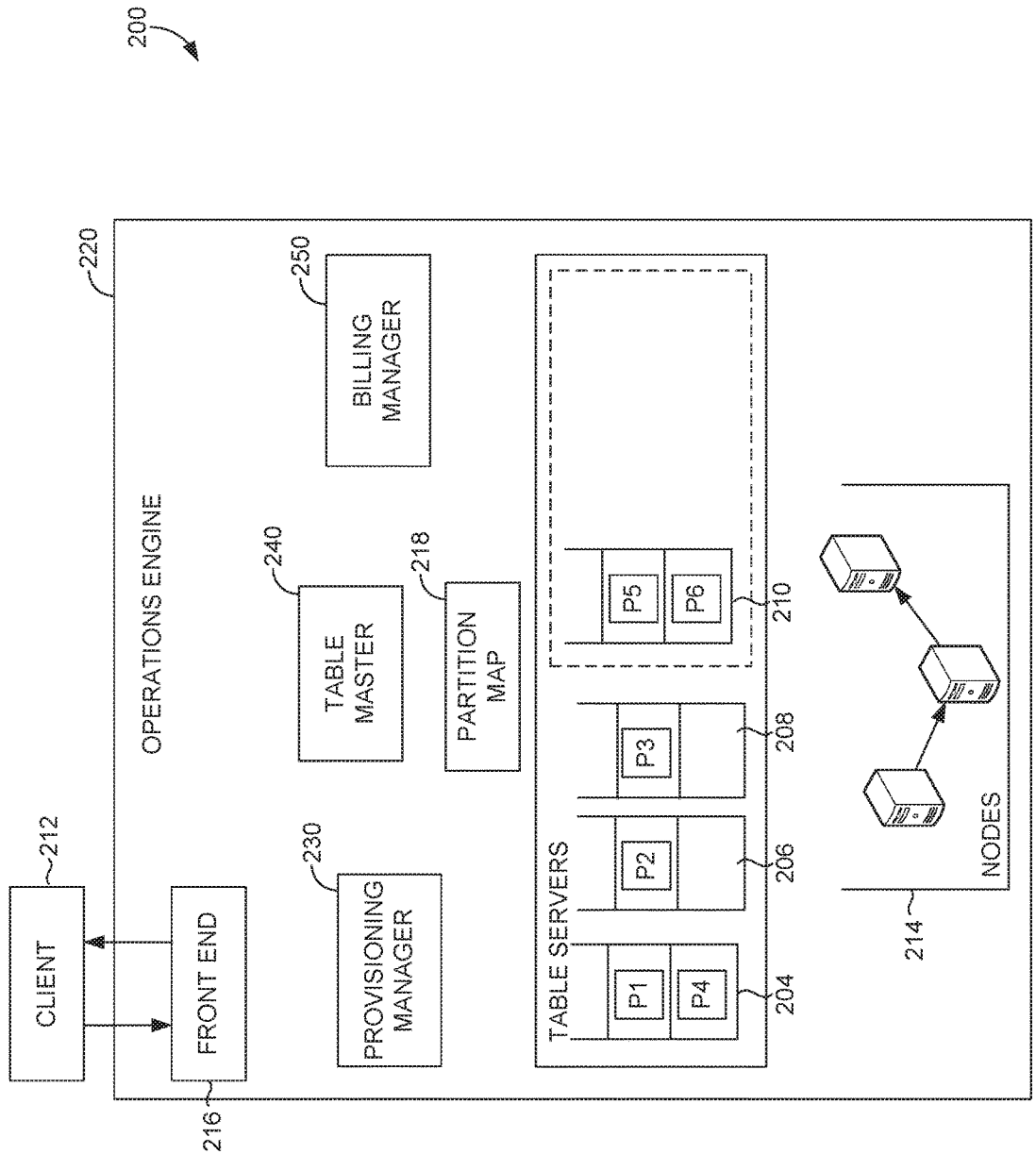
FIG. 2 is a block diagram of an example hash-based partitioning system, in accordance with embodiments described herein.

Referring now to FIG. 2, FIG. 2 illustrates an example distributed computing system with hash-based partitioning (hash-based partitioning system 200) in which implementations of the present disclosure may be employed. In particular, FIG. 2 shows a high level architecture of hash-based partitioning system 200 in accordance with implementations of the present disclosure. In accordance with embodiments of the present invention, a set of servers, referred to herein as "table servers," (e.g., table servers 204, 206, 208, 210) store and provide access to the "nodes" (e.g., nodes 214). Additionally, a set of servers, referred to herein as "table masters," (e.g., table master 240) manage the table servers. A "client" (e.g., client 212) provides applications access to the structured storage system. The hash-based partitioning system 200 includes a "provisioning manager" (e.g., provisioning manager 230), "billing manager" (e.g., table master 240), "front end" (e.g., front end 216) "partition map" (e.g., partition map 218), "table servers" and "nodes" (collectively referred to as "operations engine") that support the functionality described herein. Each may reside on any type of computing device, which may correspond to computing device 700 described with reference to FIG. 7, for example.

The hash-based partitioning system 200 is supported via a plurality of partitions. For example, hash-based partitioning system 200 can comprise a key space divided amongst the plurality of partitions. Table master 202 is configured to assign the partitions to servers 204, 206, 208, and 210, and/or other servers of the hash-based partitioning system 200 not shown. Table master 202 can also be configured to determine when a partition of the partitions is not hosted by any server due to a failure and reassign the partition to a different server. Table master 202 is further configured to control load balancing of the partitions on servers 204, 206, 208, 210, and/or other servers not shown. Additionally, table master 202 is configured to monitor resource utilization with respect to any of the partitions and/or servers 204, 206, 208, and 210, and/or other servers of hash-based partitioning system 200 not shown. It is further contemplated that table master 202 is configured to support hash-based partitioning in accordance with embodiments of the present invention, as discussed in more detail below.

Table servers 204, 206, 208, and 210 are utilized to store and provide access to nodes 214. Table master 202 is configured to manage the servers. Table servers 204, 206, 208, and 210, can be responsible for providing read and write access to partitions assigned to the server. Furthermore, each of the partitions can be assigned to a single one of the servers. In the example shown in FIG. 2, table server 204 is hosting partitions P1 and P4, table server 206 is hosting partitions P2, table server 208 is hosting partition P3, and table server 210 is hosting partitions P5 and P6. It is contemplated that hash-based partitioning system 200 may be implemented as a hybrid range-hash store where table servers 204, 206, and 208 support a hash partitioning model and table server 210 supports a range partitioning model, as discussed in more detail below.

Client 212 is configured to issue commands to some of the partitions hosted by servers 204, 206, 208, and 210 and/or other servers of hash-based partitioning system 200. Also in some implementations, client 212 may communicate through a virtual IP and software load balancer or other means that directs communication requests to a front end 216. The front end can utilize a partition map, such as partition map 218, to determine which of the servers is hosting (mapped to) which of the partitions and can send commands to those servers. Results of the commands can be received back from the servers and can be passed to the client 212. The partition map (e.g., table container) stores mappings between the partitions and the servers they are assigned to, and can typically be maintained by a master, such as master 202.

The operations engine 220 is responsible for processing provisioning operations and user request operations. Provisioning operations may include operations to create a table or operations to change (e.g., increase or decrease IOPS). A provisioning operation may be executed based on performing a split operation or a merge operation on partition to provision IOPS. In particular, table master 240 is responsible for implementing the provision logic. For example, the table master 240 determines how many partitions are needed for provisioning a provision request for IOPS by a tenant. The table master 240 performs provisioning operations to increase or decrease IOPS and determine how to execute the provisioning operations.

Changing provisioned IOPS may be performed using split operations and merge operations. In one embodiment, the table master supports provisioning IOPS based on a window of IOPS using a double-halve model, where a requested number of IOPS is provisioned with a set of partitions that support double and half a number of IOPS as a range, where the requested number of IOPS is within the range. The table master 240 may prioritize increase IOPS provisioning operations over decrease IOPS provisioning operations. The table master 240 is responsible for determining the number of partitions and partition key ranges for provisioning IOPS. Determining a number of partitions may be based on a number of requested IOPS, an IOPS limit per partition, and a flexibility factor. The table master 240 may execute provisioning operations to allocate IOPS based on a table's provisioned IOPS.

Provisioning manager 230 is responsible for managing operations in the operations engine 220. For example, the provisioning manager 230 may support the table master in performing provisioning operations. The provisioning manager 230 may update a plurality of table fields and communicate a plurality of status messages associated with provisioning operations. For example, when the provisioning manager 230 receives a tenant request, the provisioning manager 230 may update a requested IOPS entry and a requested IOPS time entry of a table row in the table container, which will in turn trigger the table master to get notified. When the table master 240 finishes the provisioning step, as discussed above, the table master 240 may update the provisioned IOPS and provisioned IOPS time, which is an indication to provisioning manager that the provisioning operation has been completed at the table master 240.

Table servers are responsible for throttling. For example, dropping requests to a partition that has too much traffic being sent to it. A given partition key value may be configured with an IOPS limit. For example, a per-partition limit of 1000 IOPS, a per partition key limit of 100 IOPS. In operation, the table server may implement throttling based on a sampling partition key values and throttling partition key values approaching the IOPS limit. Front end 216 is responsible for processing provision operations and user request operations.

The front end 216 may be configured to manage a hashing logic, such that the tables are agnostic to hashing. The front end may hash the user's partition key value to determine the hash value, and the resulting key for the request. The hash operation may be hidden from the user. By way of example, hashing is based on the partition key to determine the hash value. For any received table request, the front end may look up the account and table properties before performing row-level operations. From the account, the front end may determine that the user request is associated with a hash table. From the table, the front end may determine the hash algorithm metadata. For example, the hash algorithm and any information required for the hash algorithm (e.g., metadata) may be stored with table properties of the tenant. The tenant table properties may be fetched from a cache location or the table container.

Billing manager 250 is responsible for billing based on IOPS and an IOPS may have a defined size. For example, a write IOP may be 1 KB and a read IOP size may be 4 KB. Rounding may be used to determine the number of IOPS, for example, for writes, 800 bytes is 1 IOP, and 1 KB is 1 IOP, 1.2 KB is 2 IOPS. The billing manager 250 may generate bills for a corresponding tenant of the distributed computing system. For example, a tenant may be billed for provisioned IOPS of a given table. The tenant may also be billed for the used capacity of a given table. The provisioned IOP charge may generally be a major charge with the capacity charge being much lower. The billing manager may specifically keep the charges separate to simplify the billing model. With the simple billing model, some protection may be accommodated for cases like a low IOPS and high size table. In one embodiment, provisioned IOPS may be implemented in tiers (e.g., P1: 1 k IOPS P5: 5 k IOPS P10: 10 k IOPS P25: 25 k IOPS P50: 50 k IOPS P100: 100 k IOPS).

Exemplary Flow Diagrams

Figure 3:
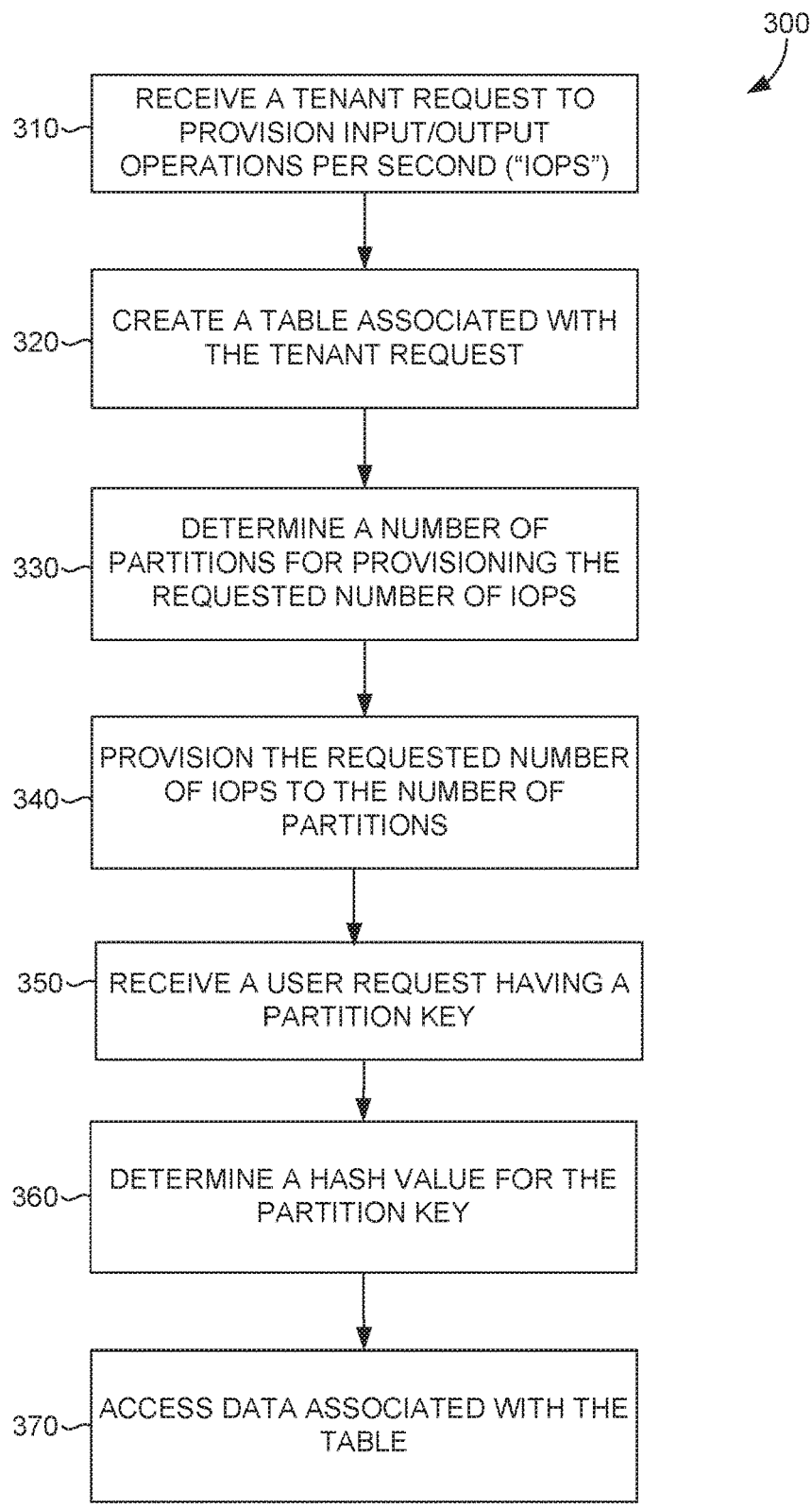
FIG. 3 is a flow diagram showing an exemplary method for implementing a hash-based partitioning system, in accordance with embodiments described herein.
Figure 4:
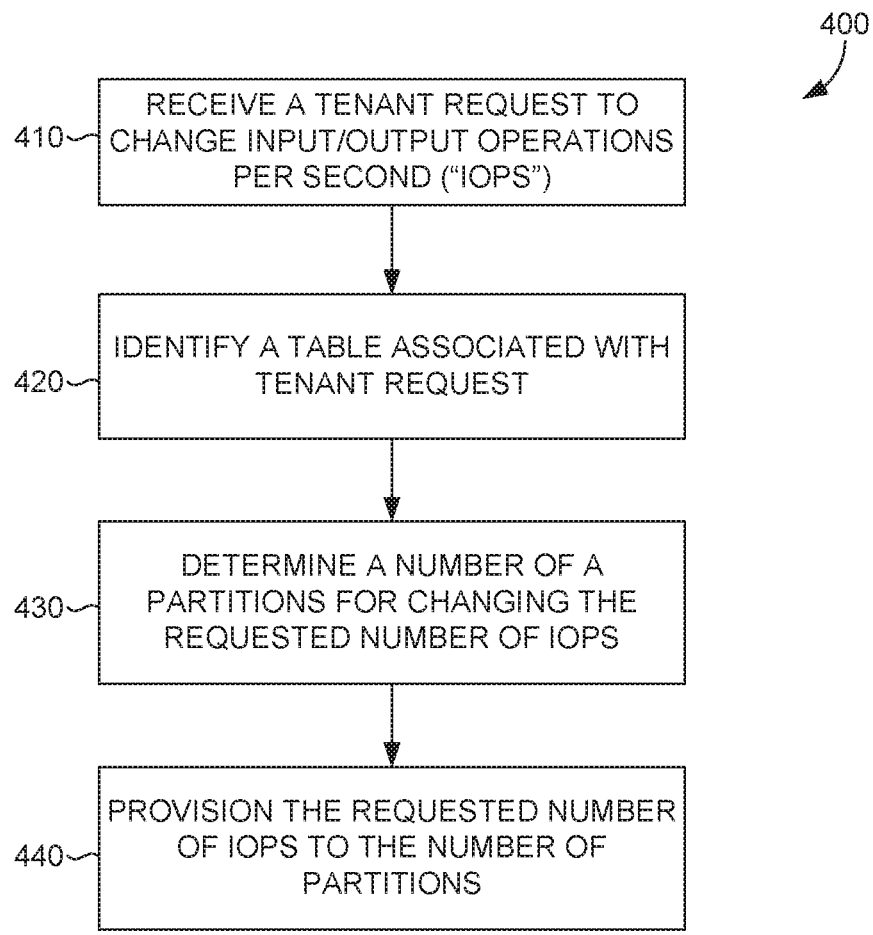
FIG. 4 is a flow diagram showing an exemplary method for implementing a hash-based partitioning system, in accordance with embodiments described herein.

With reference to FIGS. 3 and 4, flow diagrams are provided illustrating methods for implementing hash-based partitioning. The methods can be performed using the hash-based partitioning system described herein. In embodiments, one or more computer storage media having computer-executable instructions embodied thereon can, when executed by one or more processors, cause the one or more processors to perform the methods in the hash-based partitioning system.

Turning now to FIG. 3, a flow diagram is provided that illustrates a method 300 for implementing hash-based partitioning. Initially at block 310, a tenant request to provision input/output operations per second (IOPS) is received. The tenant request provision may be received via a front end and processed at a provisioning manager and table master. The tenant request includes a requested number of IOPS. In one example embodiment, based on the tenant request, a provisioning operation to provision IOPS in a hybrid range-hash table storage with hash-based partitioning is determined. The provisioning operation is selected from one of the following: a table creation provisioning operation, an IOPS increase provisioning operation, and an IOPS decrease provisioning operation; the selected provisioning operation using a table operating based on a hash partitioning model.

At block 320, based on the tenant request, a table associated with the tenant request is created. The table is included in a hybrid range-hash table storage that supports hash-based partitioning. Creating the table includes identifying hash algorithm metadata for processing user requests and storing the hash algorithm metadata in a table container. At block 330, a number of partitions for provisioning the requested number of IOPS are determined. Determining the number of partitions is based on a number of requested IOPS, an IOPS limit per partition, and a defined flexibility factor.

At block 340, the requested number of IOPS is provisioned to the number of partitions. Provisioning the requested number of IOPS comprises executing the provision operation selected comprises provisioning the requested number of IOPS based on executing a split operation or a merge operation based on a number of existing partitions. Executing the split operation or the merge operation is based on hash ranges. The table container is updated to indicate that provisioning the requested number of IOPS has been completed. The table container tracks requested IOPS and requested IOPS time. At block 350, a user request is received, the user request comprises a partition key value. At block 360, a hash value for the partition key value are determined, the hash value corresponds to the table associated with the requested number of IOPS. At block 370, based on the hash value, data associated with the table is accessed.

Turning now to FIG. 4, a flow diagram is provided that illustrates a method 400 for live migration of partitions. Initially at block 410, a tenant request to change input/output operations per second (IOPS) is received. The request comprises a requested number of IOPS. The tenant request is an IOPS increase request or an IOPS decrease request, where the IOPS increase request or the IOPS decrease request is executed based on at least one of the following: a split operation or a merge operation. At block 420, based on the tenant request, a table associated with the tenant request is identified. The table is included in a hybrid range-hash table storage that comprising hash-based partitioning.

At block 430, a number of partitions for changing the requested number of IOPS are determined. Determining the number of partitions is based on a number of requested IOPS, an IOPS limit per partition, and a defined flexibility factor. At block 440, the requested number of IOPS to the number of partitions is provisioned. Provisioning the requested number of IOPS executing, based on a number of existing partitions, an IOPS increase provisioning operation or an IOPS decrease provisioning operation using a split operation or a merge operation based on a number of existing partitions, wherein executing the split operation or the merge operation is based on hash ranges. A table container to indicate that provisioning the requested number of IOPS has been completed.

Exemplary Distributed Computing Environment

Figure 5:
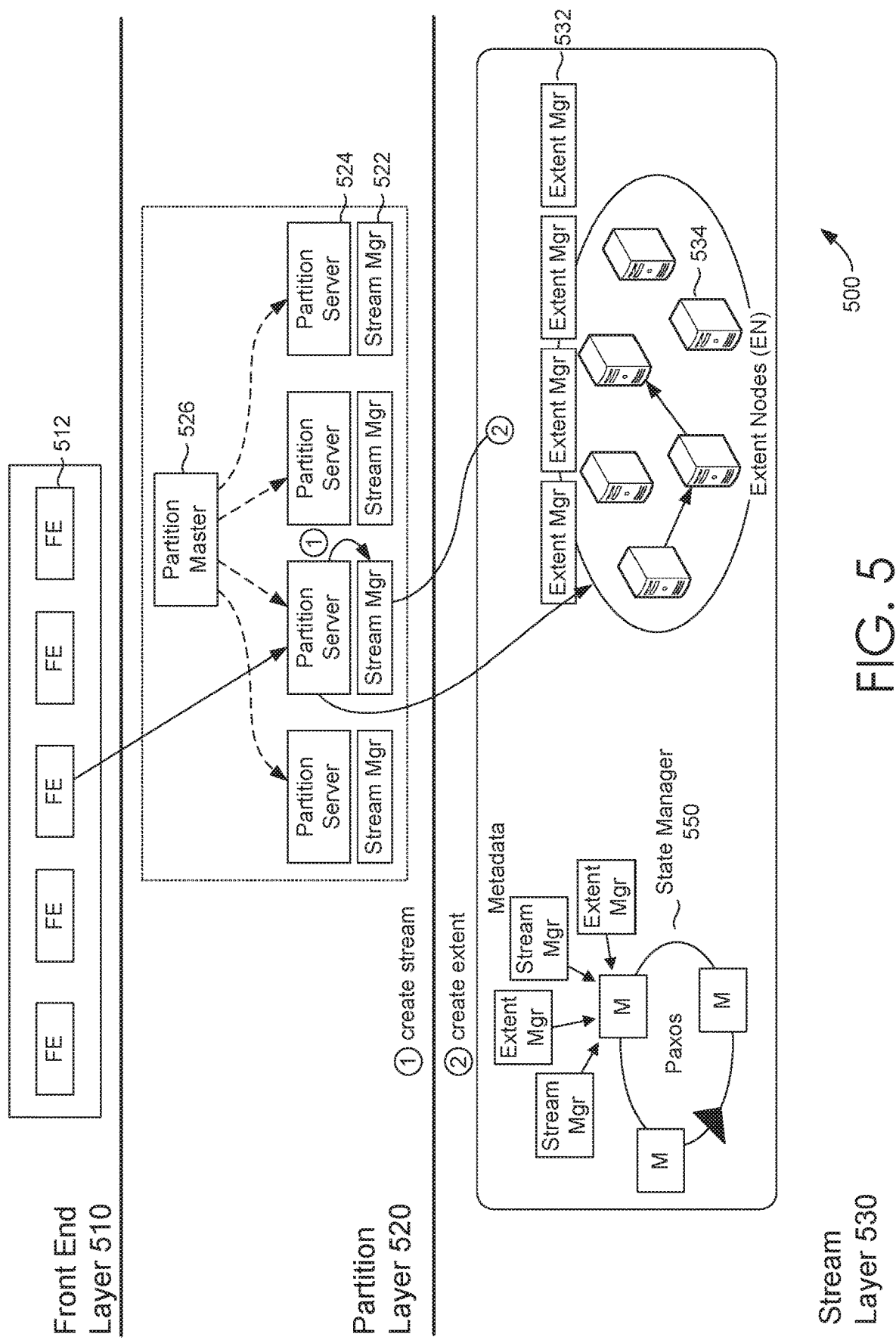
FIG. 5 is a block diagram of a distributed computing system in which embodiments described herein may be employed.

With reference to FIG. 5, by way of background, a distributed computing system 500 can include components that support distributed data synchronization. In particular, a front end layer 510, a partition layer 520, and a stream layer 530, can be components of the distributed computing system 500. The distributed computing system 500 can include a front end (FE) layer 510 having front end-servers (e.g., front server 512); a partition layer 520 having a partition master 526, partition servers (e.g., partition server 524) and stream managers (e.g., stream manager 522); and a stream layer 530 having extent nodes (ENs) (e.g., EN 534); extent managers (e.g., extent manager 532). The stream layer can include a state manager 550 for distributed management of stream and extent metadata.

In some embodiments, the state manager 550 can be implemented based on a distributed computing system (not shown) operating with the stream layer 530. Extents and streams can be partitioned and managed by many distributed extent managers and stream managers. The partition layer 520 can use the extent managers and stream managers to create user extents and user streams, for persisting customer data. An extent manager and stream manager persists their own data in distributed computing system 500 system extents and system streams. System extents and system streams are managed by the state manager (not shown). The state manager 550 operates with extent managers and stream managers to manage system extents and systems streams.

The distributed metadata stream layer 530 is distributed to scale out while maintaining highly availability and strong consistency of the metadata in the distributed storage system. The distributed metadata stream layer 530 operates in a coordinated manner with the partition layer 520. The distributed stream metadata and extent metadata are implemented based on the distributed metadata stream layer 530 imposing system restrictions which impact the partition layer in order to leverage the distributed metadata stream layer 530 efficiently. In this regard, the partition layer 520 can also be optimized to facilitate metadata management in the distributed metadata stream layer 530. The design and architecture includes considerations for both the distributed metadata stream layer 530 and the partition layer 520. The distributed computing system 500 can provide a namespace and stores data by partitioning all of the data objects within a storage cluster. The front end layer 510 can consist of a set of stateless servers that take incoming requests. A detailed discussion of a suitable architecture of the distributed storage system for performing embodiments described herein is further described in U.S. application Ser. No. 15/080,465 filed Mar. 24, 2016 and entitled "DISTRIBUTED METADATA MANAGEMENT IN A DISTRIBUTED STORAGE SYSTEM," which is incorporated herein, by reference, in its entirety.

Figure 6:
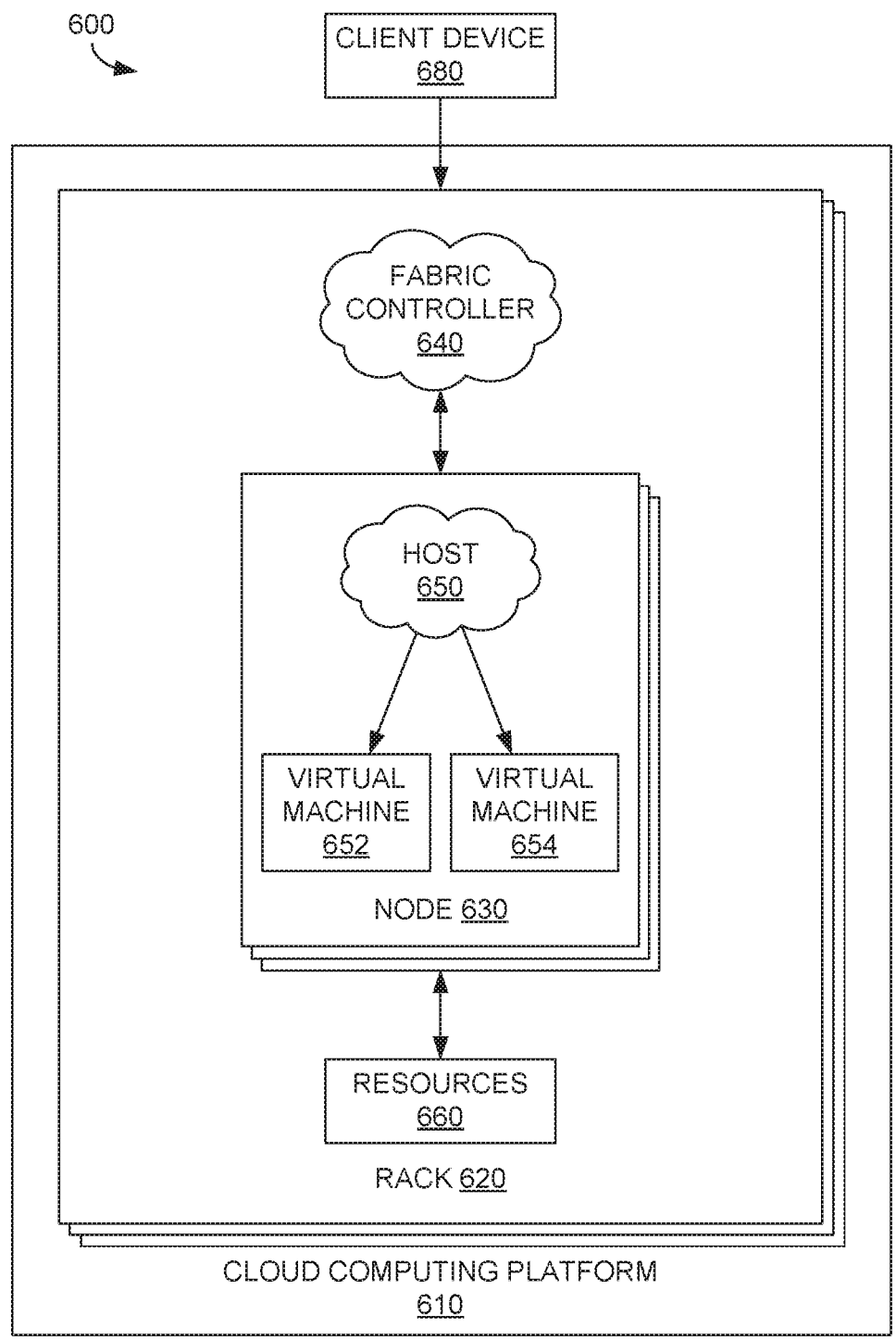
FIG. 6 is a block diagram of a computing environment suitable for use in implementing embodiments described herein.

Referring now to FIG. 6, FIG. 6 illustrates an exemplary distributed computing environment 600 in which implementations of the present disclosure may be employed. In particular, FIG. 6 shows a high level architecture of the hash-based partitioning system ("system") in cloud computing platform 610, where the system supports seamless modification of software component. It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions, etc.) can be used in addition to or instead of those shown.

Data centers can support distributed computing environment 600 that includes cloud computing platform 610, rack 620, and node 630 (e.g., computing devices, processing units, or blades) in rack 620. The system can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example. Clien device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610.

The components of cloud computing platform 610 may communicate with each other over a network (not shown), which may include, without limitation, one or more local area networks (LANs) and/or wide area networks (WANs).

Exemplary Operating Environment

Figure 7:
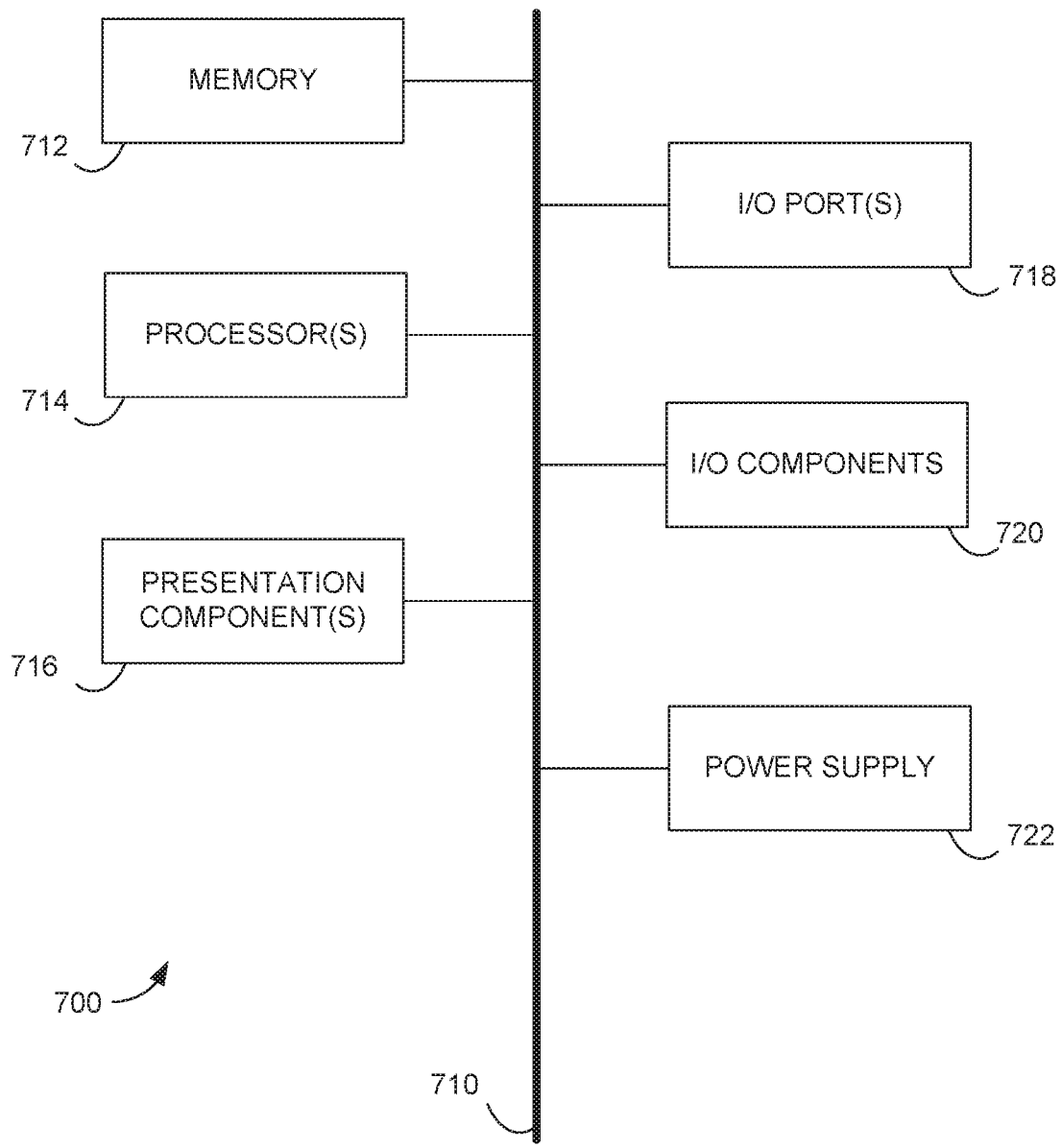
FIG. 7 is a block diagram of a computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 717, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

With reference to the hash-based partitioning system, embodiments described herein support dynamic load balancing is implemented using partition keys associated with data traffic and the size of distributed data across a partition key space. The hash-based partitioning system components refer to integrated components for live migration. The integrated components refer to the hardware architecture and software framework that support live migration functionality within the system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the hash-based partitioning system can include an API library that includes specifications for routines, data structures, object classes, and variables may support the interaction between the hardware architecture of the device and the software framework of the hash-based partitioning system. These APIs include configuration specifications for the hash-based partitioning system such that the different components therein can communicate with each other in the hash-based partitioning system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the words "informing" and "communicating" have the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the hash-based partitioning system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for providing hash-based partitioning, the system comprising:
one or more hardware processors and memory storing computer-executable instructions and components embodied thereon that, when executed, by the one or more hardware processors, cause the hardware processors to execute:
an operations engine configured to:
receive a tenant request to provision input/output operations per second (IOPS), wherein the tenant request comprises a requested number of IOPS;
based on the tenant request, determine a provisioning operation to provision IOPS in a hybrid range-hash table storage service with hash-based partitioning, wherein the provisioning operation is selected from one of the following: a table creation provisioning operation, an IOPS increase provisioning operation, and an IOPS decrease provisioning operation;
execute the selected provisioning operation for the requested number of IOPS using a table operating based on a hash partitioning model, wherein executing the selected provisioning operation is based on accessing one or more load balancing rules that indicate a dynamic configuration setting of the table, wherein the dynamic configuration setting of the table supports replication-free load balancing that obviates copying data during load balancing operations;
receive a user request, wherein the user request comprises a partition key value;
determine a hash value for the partition key value, wherein the hash value corresponds to the table associated with the requested number of IOPS; and
based on the hash value, access data associated with the table.

2. The system of claim 1, wherein the table creation provisioning operation comprises:

determining that the tenant request is associated with a tenant account that operates based on a hash partitioning model;
creating the table associated with the tenant request, wherein the table operates based on a hash partitioning model in a hybrid range-hash table storage;
identifying hash algorithm metadata for processing user requests; and
storing the hash algorithm metadata in a table container.

3. The system of claim 1, further comprising a front end of the operations engine configured to:
determine that a second user request corresponds to a table operating based on a range partitioning model; and
based on the second user request, accessing data associated with the table operating based on the range partitioning model.

4. The system of claim 1, further comprising a table master of the operation engine configured to:
track a plurality of partitions in a hybrid range-hash table storage;
determine a number of partitions for provisioning the tenant request; and
execute the provisioning operation selected from the plurality of provisioning operations.

5. The system of claim 1, wherein the replication-free load balancing is based on a hash algorithm dynamic configuration setting that is configured as a per-tenant setting or a per-account setting.

6. The system of claim 1, wherein executing the selected provisioning operation comprises performing one of the following:
provisioning the requested number of IOPS based on executing a split operation or a merge operation based on a number of existing partitions, wherein executing the split operation or the merge operation is based on hash ranges; or
executing an IOPS increase provisioning operation or an IOPS decrease provisioning operation based on updating a table container to indicate that provisioning the requested number of IOPS has been completed, wherein the table container tracks requested IOPS and requested IOPS time.

7. The system of claim 1, further comprising a provisioning manager of the operations engine configured to:
communicate a status of provisioning operations based on a table container that tracks requested IOPS, requested IOPS time, provisioned IOPS, and provisioned IOPS time.

8. The system of claim 1, further comprising a table server of the operations engine configured to:
communicate a per-table IOPS limit to a table master; and
throttle IOPS based on per-partition IOPS limits, wherein the per-table IOPS limit and the per-partition IOPS limits are associated with the one or more load balancing rules and corresponding thresholds.

9. The system of claim 1, further comprising a billing of the operations engine configured to:
generate a charge for provisioned IOPS based on provisioning tiers of IOPS and types and sizes of IOPS, wherein an IOP is a write IOP or a read IOP with a corresponding predefined size.

10. A computer implemented method for providing hash-based partitioning, the method comprising:
receiving a tenant request to provision input/output operations per second (IOPS), wherein the tenant request comprises a requested number of IOPS;

based on the tenant request, creating a table associated with the tenant request, wherein the table operates based on a hash partitioning model in a hybrid range-hash table storage service;

determining a number of partitions for provisioning the requested number of IOPS; and provisioning the requested number of IOPS to the number of partitions, wherein provisioning the requested number of IOPS is based on accessing one or more load balancing rules that indicate a dynamic configuration setting of the table, wherein the dynamic configuration setting of the table supports replication-free load balancing that obviates copying data during load balancing operations.

11. The method of claim 10, wherein creating the table is based on:

determining that the tenant request is associated with a tenant account that operates based on a hash partitioning model;

identifying hash algorithm metadata for processing user requests; and storing the hash algorithm metadata in a table container.

12. The method of claim 10, wherein determining the number of partitions is based on a number of requested IOPS, an IOPS limit per partition, and a defined flexibility factor.

13. The method of claim 10, wherein provisioning the requested number of IOPS is based on executing a split operation or a merge operation based on a number of existing partitions, wherein executing the split operation or the merge operation is based on hash ranges.

14. The method of claim 10, the method further comprising updating a table container to indicate that provisioning the requested number of IOPS has been completed, wherein the table container tracks requested IOPS and requested IOPS time.

15. The method of claim 10, the method further comprising:

receiving a user request, wherein the user request comprises a partition key value;

determine a hash value for the partition key value, wherein the hash value corresponds to the table associated with the requested number of IOPS; and based on the hash value, accessing data associated with the table.

16. One or more computer storage media having computer-executable instructions embodied thereon that, when executed by one or more processors, cause the one or more processors to perform a method for providing hash-based partitioning, the method comprising:

receiving a tenant request to change input/output operations per second (IOPS), wherein the request comprises a requested number of IOPS;

based on the tenant request, identifying a table associated with the tenant request, wherein the table operates based on a hash partitioning model in a hybrid range-hash table storage service;

determining a number of partitions for changing the requested number of IOPS; and provisioning the requested number of IOPS to the number of partitions, wherein provisioning the requested number of IOPS is based on accessing one or more load balancing rules that indicate a dynamic configuration setting of the table, wherein the dynamic configuration setting of the table supports replication-free load balancing that obviates copying data during load balancing operations.

17. The media of claim 16, wherein the tenant request is an IOPS increase request or an IOPS decrease request, wherein the IOPS increase request or the IOPS decrease request is executed based on at least one of the following: a split operation or a merge operation.

18. The media of claim 16, wherein determining the number of partitions is based on a number of requested IOPS, an IOPS limit per partition, and a defined flexibility factor.

19. The media of claim 16, wherein provisioning the requested number of IOPS comprises executing, based on a number of existing partitions, an IOPS increase provisioning operation or an IOPS decrease provisioning operation using a split operation or a merge operation based on a number of existing partitions, wherein executing the split operation or the merge operation is based on hash ranges.

20. The media of claim 16, the method further comprising updating a table container to indicate that provisioning the requested number of IOPS has been completed, wherein the table container tracks requested IOPS and requested IOPS time.

* * * * *